United States Patent [19]
Davis et al.

[11] Patent Number: 5,804,661
[45] Date of Patent: Sep. 8, 1998

[54] EPDM FLASHING COMPOSITIONS

[75] Inventors: James A. Davis; Joseph J. Kalwara, both of Indianapolis; Brian S. Alexander, Sheridan, all of Ind.

[73] Assignee: Bridgestone/Firestone, Inc., Akron, Ohio

[21] Appl. No.: 604,593

[22] Filed: Feb. 21, 1996

[51] Int. Cl.$^6$ .................................................. C08L 23/16
[52] U.S. Cl. ..................... 525/240; 524/476; 524/484; 524/487; 524/495; 524/525; 524/528; 524/571
[58] Field of Search ........................... 525/240; 524/525, 524/528, 571, 484, 476, 487, 495

[56] References Cited

U.S. PATENT DOCUMENTS

| | | | |
|---|---|---|---|
| 4,461,875 | 7/1984 | Crepeau | 525/348 |
| 4,514,442 | 4/1985 | Crepeau | 427/140 |
| 4,666,785 | 5/1987 | Crepeau | 428/521 |
| 4,732,925 | 3/1988 | Davis | 524/426 |
| 4,778,852 | 10/1988 | Futamura | 525/97 |
| 5,096,743 | 3/1992 | Shoenbeck | 427/189 |
| 5,389,715 | 2/1995 | Davis | 524/505 |
| 5,504,136 | 4/1996 | Davis et al. | 524/490 |

FOREIGN PATENT DOCUMENTS 0 494 156 B1  10/1994  European Pat. Off. .

Primary Examiner—Mark L. Warzel
Attorney, Agent, or Firm—Frank J. Troy, Sr.

[57] ABSTRACT

An EPDM flashing composition comprises 100 parts by weight of an elastomeric polymer comprising from about 85 to 100 parts by weight of at least one ethylene-propylene-diene terpolymer having up to about 2 percent by weight crystallinity and from 0 to about 15 parts by weight of an ethylene-propylene-diene terpolymer having more than 2 percent by weight crystallinity; from about 40 to 120 parts by weight of a filler selected from the group consisting of reinforcing and non-reinforcing materials and mixtures thereof, per 100 parts of the polymer; from about 40 to 105 parts by weight of a processing material and mixtures thereof, per 100 parts of the polymer; and from about 0.5 to 6 parts by weight of a cure package, per 100 parts of the polymer, the cure package comprising from about 0.1 to 1.25 parts by weight sulfur and from 0.4 to 5 parts by weight of at least one sulfur vulcanizing accelerator and being devoid of hexasulfides and thioureas. The uncured EPDM flashing composition has a longer shelf-life than current uncured, calendered commercial EPDM flashing materials, and meets the flexibility, extensibility and green strength requirements and cure characteristics desired of corner flashing compositions. Preferably, the composition has a Mooney viscosity (ML/1+4 at 135° C.) of less than about 35 Mooney units and a green strength at break of less than 65 psi.

23 Claims, No Drawings

EPDM FLASHING COMPOSITIONS

TECHNICAL FIELD

The present invention relates generally to roof flashing and, more particularly, to flashing which will conform to irregular surfaces on the roof of a building and which is especially suitable for use at the corners thereof. Specifically, the present invention relates to an uncured, calendered corner flashing composition made from ethylene-propylene-diene terpolymer, hereinafter referred to as EPDM, which has a longer shelf-life than current commercial uncured, calendered EPDM flashing compositions, and meets the flexibility, extensibility, and green strength requirements and cure characteristics desired of corner flashing compositions.

BACKGROUND OF THE INVENTION

Polymeric roof sheeting is often used as single-ply roofing membrane for covering industrial and commercial flat roofs. Such membranes are typically applied to the roof surface in a vulcanized or cured state and are known to provide outstanding weathering resistance and other excellent properties desired of roofing materials. These polymeric materials, such as EPDM, butyl rubber, etc., are well known in the art and act as effective barriers to prevent the penetration of moisture through the roof being covered.

However, cured polymeric roofing membranes of the type described above are not suitable for covering all parts of the roof, particularly those areas having an uneven or irregular shape, such as curves and penetrations through the roof. Instead, uncured, calendered roofing material, typically provided in the form of strips or patches of membrane, is used to cover the irregular shapes and contours of a roof. Such roofing material is known as flashing.

Flashing, like the roofing membranes discussed above, should have excellent weathering and water absorption resistance as well as excellent heat aging performance. In this respect, flashings made from EPDM compositions are well suited to provide such protection.

Commercially and with the advancement of EPDM roofing membranes, uncured calendered EPDM flashing compositions have become increasing more common. Furthermore, EPDM flashings are compatible with various seam tape compositions and other adhesive systems which may be laminated to and/or used in conjunction with the flashing compositions to provide self-sealing compositions.

Several patents are directed toward EPDM flashing compositions. For example, Crepeau U.S. Pat. Nos. 4,461,875 and 4,666,785 both disclose an elastomeric composition which is particularly useful as roof sheeting or flashing. The composition comprises 100 parts of an elastomer selected from the group consisting of EPDM, butyl rubber or mixtures thereof; 0.1 to 3.0 parts of a compound having the structural formula $[(CH_2)_nNCS]_2S_6$, where n is 4 or 5; and 0 to 5.0 parts of a sulfur donor curative. Where EPDM is used, the composition more particularly requires 50 parts of a terpolymer containing 51.9 percent by weight ethylene, 39.1 percent by weight propylene and 9.0 percent by weight 5-ethylidene-2-norborene, this EPDM having a Mooney viscosity (ML/1+4 at 125° C.) of 68, and 50 parts of a second terpolymer containing 71.6 percent by weight ethylene, 23.9 percent propylene and 4.5 percent by weight 5-ethylidene-2-norborene, this second EPDM having a Mooney viscosity (ML/1+4 at 125° C.) of 77. The composition also requires the use of a hexasulfide in conjunction with the sulfur curative.

In another publication, European Patent Publication No. 0,494,156, Crepeau discloses that hexasulfide is not required where a more expensive dialkylthiourea is employed instead. Thus, this publication teaches a flashing composition comprising 100 parts of an elastomer made from EPDM or butyl rubber or both; 0.1 to 3.0 parts of a dialkylthiourea; 0.4 to 5 parts sulfur; and 0.4 parts of a sulfur accelerator.

Given this current state of the art, it is seen as highly desirable to produce EPDM flashing compositions which are devoid of hexasulfides or thioureas, thereby eliminating further costs of production for such EPDM flashing compositions and reducing the levels of cure ingredients found in the composition.

In addition, not all flashing compositions are necessarily suitable for covering all irregular surfaces on a roof, however. For instance, most, if not all, current EPDM flashing compositions, including the EPDM composition disclosed in the U.S. Pat. Nos. 4,461,875 and 4,666,785, exceed the composition viscosity and green strength requirements desired of an EPDM flashing composition which would be useful for the corners of a roof. In other words, EPDM corner flashing compositions should have a lower composition viscosity and green strength than other EPDM membrane or flashing compositions. This means that desired EPDM flashings should have a reduced compound viscosity of less than about 35 Mooney units (ML/1+4 at 135° C.) and a green strength at break of about 65 psi or less. Where these requirements are not met, it has been found that, shortly after rooftop installation, the edges of the uncured flashing composition will begin to detach from the installed cured roofing membrane.

Furthermore, it is fairly typical to sell EPDM flashing commercially in the form of flashings in a box of 20 to 50, but not all of these flashings are actually used at one time on one particular roof. Oftentimes, it may be more than one year before all of the flashings in one particular box are used in actual rooftop installations. Unfortunately, however, a storage period of more than nine to twelve months is known to cause the flashings to become partially cured and somewhat difficult to form by hand. Desirably and in order for them to afford protection to the irregular contours of a roof, flashings, especially corner flashings, should be very flexible, extensible and easy to form by hand, but once formed, should not return to their original shape or form. That is, the flashing materials need to be soft and uncured in order to conform to the irregular surfaces of a roof.

Once installed on the roof, flashing should be curable, but only very slowly. Desirably, flashing should have a shelf-life of more than one year, and during that period of storage, the flashing should remain uncured so that it can be formed by hand upon installation to flash and waterproof the irregular surfaces of the roof. However, during the summer months, flashing compositions stored in warehouses and the like are commonly exposed to temperatures far greater than standard ambient temperatures of about 23° C. (73° F.). When exposed to exceedingly high temperatures of up to 60° C. (140° F.) for any length of time, current flashing compositions cure prematurely and become stiff due to the formation of sulfur crosslinks between the polymer chains.

Thus, the need exists for an EDPM flashing composition which has a longer shelf-life than current commercial uncured, calendered EPDM flashing compositions, and meets the flexibility, viscosity and green strength requirements desired of corner flashing compositions. Desirably, such a fully compounded EPDM flashing composition would have a Mooney viscosity ranging between about 15 and about 35 Mooney units (ML/1+4 at 135° C.), and a green strength at break of between about 20 and about 65 psi.

SUMMARY OF THE INVENTION

It is, therefore, an object of the present invention to provide an EPDM flashing composition which is suitable for use to flash corners and other curves and penetrations on a roof.

It is another object of the present invention to provide an EPDM flashing composition, as above, which is flexible, extensible, easy to form by hand and self-sealing, but once formed, does not return to its original shape.

It is yet another object of the present invention to provide an EPDM flashing composition, as above, which provides excellent weathering resistance, water absorption resistance, and heat aging performance.

It is still another object of the present invention to provide an EPDM flashing composition, as above, which is very slow curing, but yet rooftop curable.

It is a further object of the present invention to provide an EPDM flashing composition, as above, which is compatible with various seam tape and adhesive systems.

It is yet a further object of the present invention to provide an EPDM flashing composition, as above, which has long storage stability and shelf-life, even when exposed to temperatures ranging from 21° C. (70° F.) to 60° C. (140° F.).

It is still a further object of the present invention to provide an EPDM flashing composition, as above, which has a lower viscosity and green strength than other commercial EPDM membrane or flashing compositions.

It is yet another object of the present invention to provide an EPDM flashing composition, as above, which is devoid of hexasulfides and thioureas.

In general, the objects of the present invention are accomplished by providing an EPDM flashing composition comprising 100 parts by weight of an elastomeric polymer comprising from about 85 to 100 parts by weight of at least one ethylene-propylene-diene terpolymer having up to about 2 percent by weight crystallinity and from 0 to about 15 parts by weight of an ethylene-propylene-diene terpolymer having at least about 2 percent by weight crystallinity; from about 40 to 120 parts by weight of a filler selected from the group consisting of reinforcing and non-reinforcing materials and mixtures thereof, per 100 parts of the polymer; from about 40 to 105 parts by weight of a processing material and mixtures thereof, per 100 parts of the polymer; and from about 0.5 to 6 parts by weight of a cure package per 100 parts of the polymer, the cure package comprising from about 0.1 to 1.25 parts by weight sulfur and from 0.4 to 5 parts by weight vulcanizing accelerators and being devoid of hexasulfides and thioureas.

Other objects of the invention may be accomplished by providing an EPDM corner flashing composition comprising 100 parts by weight of an elastomeric polymer comprising from about 85 to 100 parts by weight of at least one ethylene-propylene-diene terpolymer having up to about 2 percent by weight crystallinity and from 0 to about 15 parts by weight of an ethylene-propylene-diene terpolymer having at least about 2 percent by weight crystallinity; and from about 0.5 to 6 parts by weight of a cure package per 100 parts of the polymer blend, the cure package comprising from about 0.1 to 1.25 parts by weight sulfur and from 0.4 to 5 parts by weight vulcanizing accelerators and being devoid of hexasulfides and thioureas, the composition having a Mooney viscosity (ML/1+4 at 135° C.) of less than about 35 Mooney units and a green strength at break of less than about 65 psi.

At least one or more of the foregoing objects which shall become apparent to those skilled in the art are described in greater detail with reference to the specification which follows.

PREFERRED EMBODIMENT OF THE INVENTION

As noted hereinabove, flashing compositions containing EPDM have become increasingly more common. The term EPDM is used in the sense of its definition as found in ASTM D-1418-85 and is intended to mean a terpolymer of ethylene, propylene and a diene monomer. Although not to be limited thereto, illustrative methods for preparing such terpolymers are found in U.S. Pat. No. 3,280,082 the disclosure of which is incorporated herein by reference.

Notably, the preferred terpolymers of the present invention are substantially amorphous. That is, at least one EPDM terpolymer, of the elastomeric polymer employed to make the flashing composition of the present invention should have less than about two weight percent crystallinity. More particularly, the elastomeric EDPM flashing composition of the present invention should have about 85 to 100 parts by weight of at least one EPDM terpolymer having up to about two weight percent crystallinity, and 0 to about 15 parts by weight of an EPDM terpolymer having more than about two weight percent crystallinity. More preferably, the composition should include at least about 95 parts by weight of amorphous EPDM (having up to 2 weight percent crystallinity) and, optionally, only up to about 5 parts by weight of crystalline or semi-crystalline EPDM (having more than 2 weight percent crystallinity).

Any EPDM containing up to 2 weight percent crystallinity and exhibiting the properties discussed hereinbelow should be suitable for use in the present invention. Typically, amorphous EPDMs having less than about 65 weight percent ethylene and from about 1.5 to about 4 weight percent of the diene monomer with the balance of the terpolymer being propylene or some other similar olefin type polymer is desired. Such EPDMs also preferably exhibit a Mooney viscosity (ML/1+4 at 125° C.) of about 45 and preferably up to about 4 weight percent unsaturation.

The diene monomer utilized in forming the EPDM terpolymers is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

A typical EPDM having less than 2 weight percent crystallinity is available from Exxon Chemical Co. under the tradename Vistalon® MD-2727. This EPDM terpolymer has a Mooney viscosity (ML/1+4 at 125° C.) of about 44±5, an ethylene content of about 56 weight percent and about 2.1 weight percent unsaturation. Another example of an EPDM having less than 2 weight percent crystallinity is Royalene 3399, available from Uniroyal Chemical. This EPDM terpolymer has a Mooney viscosity (ML/1+4 at 125° C.) of about 45±5, an ethylene content of about 58 weight percent and about 1.5 weight percent unsaturation.

It will be appreciated that the subject flashing composition may comprise 100 parts of an amphorous EPDM as the sole elastomeric polymer for the composition. However, it is also contemplated that more than one EPDM having less than 2 weight percent crystallinity may be employed.

For example, about 90 to 95 parts of Royalene 3399 can be blended with Royalene 502 (Uniroyal Chemical), a higher ethylene containing EPDM also having less than 2 weight percent crystallinity. Royalene 502 is characterized as having a Mooney Viscosity of 60±5, an ethylene content of about 62.5 weight percent and about 4.5 weight percent unsaturation.

When EPDMs having more than 2 percent crystallinity from the ethylene component are employed, these EPDMs preferably should contain more than about 65 weight percent ethylene and from about 2 to about 4 weight percent of the diene monomer with the balance of the terpolymer being propylene or some other similar olefin type polymer. Although not necessarily limiting, such EPDMs also should exhibit a Mooney viscosity (ML/1+4 at 125° C.) of about 52 and should have less than about 4 weight percent of unsaturation. Non-conjugated dienes like those exemplified above can also be used for these types of EPDMs as well.

A typical EPDM having more than 2 weight percent crystallinity is available from Exxon Chemical Co. under the tradename Vistalon® 3708. This EPDM terpolymer has a Mooney Viscosity (ML/1+4 at 125° C.) of about 52±5, an ethylene content of about 69 weight percent and about 3.2 weight percent unsaturation.

By reducing the amount of crystalline, high ethylene-containing EPDM terpolymer to less than about 15 parts by weight, and more preferably, from 0 to about 5 parts by weight in combination with increasing the amount of non-crystalline, amorphous EPDM terpolymer to at least about 85 parts by weight, and more preferably, to about 95 to 100 parts by weight, the green strength of the flashing composition will be reduced as compared to the green strength of commercial EPDM flashing compositions currently available.

In addition to the EPDM terpolymer or blend of terpolymers employed, the flashing composition of the present invention also includes fillers, processing oils and curatives as well as other optional rubber chemical additives including activators, all of which are discussed hereinbelow.

With respect to the filler, suitable fillers are selected from the group consisting of reinforcing and non-reinforcing materials, and mixtures thereof, as are customarily added to rubber. Examples include both inorganic and organic materials such as carbon black, ground coal, cryogenically or ambiently ground rubber, and the like. Generally, preferred fillers include carbon black and cryogenically or ambiently ground rubber.

Carbon black is used in an amount of about 40 parts to about 120 parts per 100 parts of polymer (phr), preferably in an amount of about 60 to about 110 phr. The preferred range of carbon black herein (60 to 110 phr) is about equal to the amount of carbon black normally used in preparing sulfur-cured EPDM membrane sheeting or flashing. The carbon black useful herein may be any carbon black suitable for the purposes disclosed hereinbelow. Preferred are furnace blacks such as GPF (general purpose furnace), FEF (fast extrusion furnace) and SRF (semi-reinforcing furnace). Most preferred is N650 HiStr GPF Black, a petroleum-derived, black reinforcing filler having an average particle size of about 60 nm and a specific gravity of about 1.80 g/cc.

Essentially any cryogenically or ambiently ground rubber may be employed as a filler in the composition of the invention. The preferred cryogenically or ambiently ground rubbers are cryogenically or ambiently ground EPDM, butyl, neoprene and the like. A preferred cryogenically or ambiently ground rubber is a ground EPDM rubber. The preferred ground EPDM rubber is a fine black rubbery powder having a specific gravity of 1.160±0.015 g/cc and a particle size ranging from about 30 to about 300 microns with an average particle size ranging from about 50 to about 80 microns. Amounts range from about 2 to 30 phr with about 2 to 10 phr being preferred. Significantly, this amount of ground rubber is less than is found in current EPDM flashings and membranes.

With respect to the processing material, it is included to improve the processing behavior of the composition (i.e. to reduce mixing time and to increase the rate of sheet forming) and includes processing oils, waxes and the like. The process oil is included in an amount ranging from about 40 parts to about 105 parts process oil per hundred parts polymer (phr), preferably in an amount ranging from about 60 phr to about 85 phr. A preferred processing oil is a paraffinic oil, e.g. Sunpar 2280, which is available from the Sun Oil Company. Other petroleum derived oils including naphthenic oils are also useful.

In addition to the above ingredients which are mixed to form a masterbatch in the preferred embodiment, activators such as zinc oxide and stearic acid may optionally be added to and made a part of the masterbatch. Amounts of these activators can vary depending upon processing needs, but it is conventional to add about 5 phr zinc oxide and about 1 phr stearic acid to the masterbatch.

A cure package containing sulfur and one or more sulfur vulcanizing accelerators is then prepared and added to the EPDM flashing composition. The cure package for the flashing composition of the present invention may range from about 0.5 phr to about 6 phr by weight with the preferred amounts ranging from about 1 to about 5 phr. It will be appreciated that this amount is lower than is conventionally used in comparable EPDM flashing compositions and permits the flashing composition to cure very slowly, in place, after installation on the roof of a building. Thus, the long-term storage stability or shelf-life of the resulting flashing composition may be extended beyond one year. In fact, it is believed that the flashing composition of the present invention will be suitable for storage for 18 months to 2 years, almost twice as long as current commercial EPDM flashings.

As part of the cure package, sulfur is preferably employed in amounts of about 0.1 to 1.25 phr, with about 0.4 phr being most preferred. This amount of sulfur is relatively low as compared to other commercial EPDM flashing and membrane compositions.

In addition, the cure package provides one or more vulcanizing accelerators including thiuram monosulfides and disulfides such as tetramethylthiuram monosulfide (TMTMS); tetrabutylthiuram disulfide (TBTMS); tetramethylthiuram disulfide (TMTDS); tetraethylthiuram monosulfide (TETDS); and the like; benzothiazole sulfenamides such as N-oxydiethylene-2-benzothiazole sulfenamide; N-cyclohexyl-2-benzothiazole sulfenamide; N,N-diisopropyl-2-benzothiazole sulfenamide; N-tert-butyl-2-benzothiazole sulfenamide (TBBS) and the like; 2-mercaptoimidazoline; N,N-diphenyl-guanadine; N,N-di-(2-methylphenyl)guanadine; 2-mercaptobenzothiazole; 2-(morpholinodithio)-benzothiazole disulfide; zinc 2-mercaptobenzothiazole and the like; a sulfur donor such as 4,4'-dithiodimorpholine and the like, dithiocarbamates such as tellurium diethyldithiocarbamate; copper dimethyldithiocarbamate; bismuth dimethyldithiocarbamate; cadmium diethyldithiocarbamate; lead dimethyldithiocarbamate; zinc diethyldithiocarbamate and zinc dimethyldithiocarbamate.

It should be appreciated that the foregoing list is not exclusive, and that other vulcanizing agents known in the art to be effective in the curing of EPDM terpolymers may also be utilized. For a list of additional vulcanizing agents, see *The Vanderbilt Rubber Handbook*, referenced hereinabove. However, it will be appreciated that thioureas such as ethylene thiourea; N,N-dibutylthiourea; N,N-diethylthiourea and the like as well as various hexasulfides such as dipentamethylene thiuram hexasulfide (DPTH) are not specifically listed above. That is because the present invention may be devoid of thioureas and hexasulfides in the flashing composition, but still maintain its effectiveness to cure slowly on a rooftop.

Amounts of the various components that can be employed in the cure package are set forth in Table I hereinbelow which provides both broad and preferred ranges for each type of component, when present. Again, the total amount of the cure package employed ranges between about 0.5 and 6 phr, depending upon the amount of sulfur, the vulcanizing accelerators selected and the intended end use of the EPDM flashing composition. That is, when employed as corner flashing, the amount of sulfur and selection of accelerators in the flashing composition will be dependent upon the proposed use of the composition. For example, where the composition is to become corner flashing patches which are to be used over a period of time, the amounts of sulfur and vulcanizing accelerators employed will be at the lower end of the range. In this embodiment, 0.4 parts sulfur, 0.12 parts tetramethylthiuram disulfide (TMTDS) and 0.4 parts N-tert-butyl-2-benzothiazole sulfenamide (TBBS) are preferred.

TABLE I

Cure Package Components

| Ingredients | Broad Range, phr | Preferred Range, phr |
| --- | --- | --- |
| Sulfur | 0.1 to 1 | 0.35 to 0.75 |
| Thiuram accelerators | | |
| TMTMS | 0.1 to 2 | 0.25 to 1 |
| TMTDS | 0.1 to 2 | 0.25 to 1 |
| TETDS | 0.1 to 2 | 0.25 to 1 |
| Thiazole accelerators | | |
| Captax - MBT | 0.1 to 2 | 0.25 to 1.5 |
| Altax - MBTS | 0.1 to 2 | 0.25 to 1.5 |
| Sulfenamide accelerators | | |
| N-cyclohexyl-2-benzothiazole sulfenamide | 0.1 to 2.5 | 0.25 to 1.5 |
| N-tert-butyl-2-benzothiazole sulfenamide | 0.1 to 2.5 | 0.25 to 1.5 |
| Dithiocarbamate accelerators | | |
| Copper dimethyldithiocarbamate | 0.1 to 2 | 0.25 to 1.25 |
| Dimethylcyclohexylammonium dibutyl dithiocarbamate | 0.1 to 2 | 0.25 to 1.25 |
| Tellurium diethyldithiocarbamate | 0.1 to 2 | 0.25 to 1.25 |

It is to be understood that the cure package comprises sulfur and at least one or more of the foregoing accelerators and thus, the amounts presented in Table I are those wherein one or more of the above accelerators are present. As noted hereinabove, the flashing composition is uncured and should remain uncured until it is installed on the rooftop, and even then, it should rooftop cure very slowly and preferably at temperatures of at least 60° C. (140° F.) or higher.

Other optional ingredients may include, for example, other elastomers (e.g., butyl rubber, neutralized sulfonated EPDM, neutralized sulfonated butyl rubber) in place of minor amounts of the EPDM, secondary inorganic fillers (e.g., talc, mica, clay, silicates, whiting) with total secondary filler content usually ranging from about 10 to about 35 phr, and conventional amounts of other conventional agents, such as antioxidants, antiozonants, flame retardants, and the like. The conventional agents and fillers are not seen to affect the essential nature of the invention, however.

The compounding ingredients can be admixed, utilizing an internal mixer (such as a Banbury mixer), an extruder, and/or a two-roll mill, or other mixers suitable for preparing viscous relatively uniform admixtures. When utilizing a type B Banbury internal mixer, in a preferred mode, the dry or powdery materials such as carbon black are added first followed by the liquid process oil and finally EPDM (this type of mixing can be referred to as an upside-down mixing technique).

The resulting admixture is sheeted to a thickness ranging from 5 to 200 mils, preferably from about 60 to 70 mils, by conventional sheeting methods, for example, milling, calendering or extrusion. Preferably, the admixture is sheeted to about 65 gauge (0.065 inches) which is the industry desired thickness for flashing for use in roofing applications. Next, in accordance with known commercial techniques, the flashing is typically laminated to a compatible seam tape or other adhesive system. While any compatible seam tape may be employed, it is generally recognized that EPDM flashing compositions are easily laminated to EPDM or butyl rubber seam tapes which, in turn, and easily applied to EPDM roofing membranes during installation on the rooftop. Although not to be limited thereto, illustrative methods for preparing seam tapes suitable for use with the flashing compositions of the present invention are found in U.S. Pat. No. 5,242,727, the disclosure of which is incorporated herein by reference. Once laminated to the seam tapes, the sheeting/flashing is then cut into patches or strips of a desired length and configuration and packaged by conventional means for commercial sale and use.

The resultant flashing of the present invention is flexible and extensible. It can be shaped or easily formed by hand. Once formed, however, the flashing material does not retract to its original form or shape. Since it is made from EPDM, the resultant flashing is known to exhibit excellent weathering and water absorption resistance as well as heat aging performance. Furthermore, and most importantly, the resultant flashing exhibits a relatively long storage stability or shelf-life of approximately 18 months to 2 years, even when exposed to warehouse temperatures known to range invention is much slower curing compared to current commercial EPDM flashing materials, and has a Mooney viscosity of less than about 35 Mooney units (ML/1+4 at 135° C.) and preferably about 20 to 30 Mooney units. The composition also exhibits a much lower green strength at break of less than about 65 psi and preferably about 25 to 50 psi, as compared to commercial EPDM flashing compositions.

In order to demonstrate practice of the present invention, several compounds were prepared and subjected to various physical property tests, as will now be set forth in detail. The EPDM polymer selected included Vistalon® MD-2727. Characterization of this polymer as well as Royalene® 3399 is presented in Table II hereinbelow.

TABLE II

Polymer Characterization Study

|  | Vistalon® MD-2727 | Royalene® 3399 |
|---|---|---|
| ML/1 + 4 at 125° C. | 44 ± 5 | 45 ± 5 |
| Ethylene Content, wt % | 56 | 58 |
| Crystallinity, wt %* | <0.2 | <0.4 |
| Tg, °C. (by DSC) | −54 | −55 |
| Tm, °C. (by DSC)* | 46 | 48 |
| Unsaturation, % | 2.1 | 1.5 |
| Type of unsaturation | ENB[a] | ENB[a] |
| Mn | 82,950 | 83,200 |
| Mw | 243,500 | 232,300 |
| Mn/Mw ratio | 2.94 | 2.79 |

[a] 5-ethylidene-2-norbornene
*The polymer melt temperatures and amount of crystallinity were determined using differential scanning calorimeter (DSC) technique.

The following examples are submitted for the purpose of further illustrating the nature of the present invention and are not to be considered as a limitation on the scope thereof. Parts are by weight, per hundred rubber hydrocarbon (phr), unless otherwise indicated.

TABLE III

EPDM Corner Flashing Compositions

| Example Nos. | 1 | 2 | 3 | 4 | Control 5 |
|---|---|---|---|---|---|
| Amorphous EPDM[a] | 90 | 100 | 100 | 100 | 85 |
| Crystalline EPDM[b] | 10 | — | — | — | 15 |
| Carbon Black[c] | 110 | 110 | 110 | 110 | 110 |
| Ground Rubber[d] | 3.35 | — | — | — | 6.7 |
| Processing Oil[e] | 82 | 82 | 82 | 82 | 80 |
| Zinc oxide | 5 | 5 | 5 | 5 | 5 |
| Stearic acid | 1 | 1 | 1 | 1 | 1 |
| Masterbatch (parts) | 301.35 | 298 | 298 | 298 | 302.7 |
| Sulfur | 0.4 | 0.4 | 0.4 | 0.4 | 0.95 |
| TMTDS | 0.4 | — | 0.4 | 0.12 | [f] |
| DPTH | 0.1 | — | — | — | [f] |
| TBBS | 0.5 | 0.6 | 0.4 | 0.4 | [f] |
| Curew Package (parts) | 1.4 | 1 | 1.2 | 0.92 | 3.15 |
| TOTAL (parts) | 302.75 | 299.0 | 299.2 | 298.92 | 305.85 |

[a] Vistalon MD-2727
[b] Vistalon 3708
[c] N650 HiStr GPF Black
[d] EPDM Cryogrind
[e] Sunpar 2280 Oil
[f] Presence and amounts may vary.

The examples illustrated in Table III comprise black EPDM corner flashing compositions. Examples 2–4 comprise 100 parts by weight of amorphous EPDM, about 110 parts carbon black, about 82 parts processing oil, about 5 parts zinc oxide, and about 1 part stearic acid to formulate the rubber masterbatch. A cure package comprising about 0.4 parts by weight sulfur with varying amounts, but less than about 1 part in total, of sulfur vulcanizing accelerators are then added to the masterbatch. Example 1 includes about 90 parts amorphous EPDM and about 10 parts semi-crystalline EPDM, as well as about 3.35 parts of finely ground rubber. The use of ground rubber is optional. Example 5 is seen as outside the present invention and is a typical commercial EPDM flashing. This flashing is used as a control and includes about 85 parts by weight amorphous EPDM and about 15 parts by weight crystalline EPDM, about 110 phr carbon black, about 6.7 phr ground rubber, 80 phr processing oil, 5 phr zinc oxide and 1 phr stearic acid. Total cure package content is more than 3 phr. While the cure package of the commercial EPDM flashing is proprietary, it does include sulfur and at least one sulfur accelerator, including DPTH, a hexasulfide. Complete formulations for each example appear in Table III hereinabove with all parts given on the basis of parts per hundred parts of rubber (phr) by weight, unless otherwise specified. The specific gravity of the formulae range from about 1.1005 to about 1.1098 g/cc.

The cure characteristics, viscosity and scorch measurements, green strength properties and stress-strain data were then determined for each example of the present invention and compared to the known properties of the control. The cure characteristics of the fully compounded corner flashing compositions were determined by means of a Monsanto Oscillating Disc Rheometer (ASTM Method D2084-81). The specific conditions employed involved using a mini-die attachment operating at 100 rpm, and the effecting of a three degree arc at 160° C. during the test procedure.

The compound processing characteristics of the flashing compositions were determined using a Monsanto Mooney Viscometer (MV-2000E). The specific test conditions involved using a large rotor (1.5-inches in diameter) die attachment operating at 135° C. during the test procedure. The Mooney viscometer provided useful information involving the compound viscosity and processing (scorch) safety of the fully compounded EPDM flashing compositions.

Each of the corner flashing compositions (Examples 1–4) were pressed to a thickness of about 60 mils and cut into a plurality of test specimens. The size of each test specimen was 0.5-inch (width) by four inches in length, and the specimens were tested in triplicate. The initial Instron jaw separation was two inches. Each test specimen was tested using a crosshead speed of 20 inches per minute on a table model 4301 Instron Universal Tester. The Universal Tester (a testing machine of the constant rate-of-jaw separation type) is equipped with suitable grips capable of clamping the test specimens, without slippage.

For testing purposes, dumbbell-shaped specimens were cut from individual 60-mil thick flat sheets of the flashing material according to ASTM D-412 (Method A-dumbbell and straight specimens). Modulus, tensile strength and elongation at break measurements were obtained using the table model Instron® Tester, Model 4301, and the test results were calculated in accordance with ASTM D-412. All dumbbell test specimens were allowed to set for about 24 hours, following which testing was carried out at 23° C.

Physical properties of each of the rubber compounds were measured and have been reported in Table IV hereinbelow. The resultant flashing compositions of the present invention as exemplified in Table III can be characterized, as shown in Table IV, as tackier, softer, and easier forming as well as slower curing as compared to current, commercial flashing compositions. These compositions also exhibit a lower green strength and Mooney viscosity relative to the current commercial EPDM flashing compositions. These and other physical properties are presented in Table IV hereinbelow.

TABLE IV

Physical Properties

| Example No. | 1 | 2 | 3 | 4 | Control 5 |
|---|---|---|---|---|---|
| Rheometer at 320° F. (160° C.), 3° Arc, mini-die | | | | | |
| Scorch time, minutes | 6.53 | 9.31 | 6.46 | 7.02 | 3.2 |
| Time to 50% cure, min. | 10.36 | 14.39 | 10.57 | 11.46 | 6.3 |
| Time to 90% cure, min. | 20.54 | 25.58 | 23.16 | 24.21 | 13.6 |
| Minimum torque, lb-inch | 4.73 | 4.18 | 4.47 | 4.06 | 5.2 |
| Maximum torque, lb-inch | 20.59 | 15.26 | 18.11 | 15.89 | 35.6 |
| Mooney Scorch at 275° F. (135° C.) - large rotor | | | | | |
| Minimum Viscosity, MU | 23.6 | 21.9 | 22.3 | 24.3 | 31 |
| $T_5$, minutes | 20.07 | 38.14 | 19.68 | 24.39 | 7.2 |
| $T_{35}$, minutes | 36.11 | >60 | 39.64 | >60 | 14.3 |
| Green Strength at 73° F. (23° C.)[a] | | | | | |
| 100% Modulus, psi | 39–41 | 37–39 | 36–39 | 38–41 | 72 |
| 600% Modulus, psi | 36–42 | 35–38 | 37–41 | 35–42 | 58 |
| Green Strength @ break, psi | 40–44 | 37–42 | 38–42 | 41–46 | 74 |
| Elongation at break, % | 1560 | 1585 | 1505 | 1540 | 1650 |
| Stress-Strain Properties at 73° F. (23° C.)[b] | | | | | |
| 100% Modulus, psi | 195 | 110 | 135 | 150 | 312 |
| Tensile at break, psi | 810 | 520 | 685 | 660 | 1615 |
| Elongation at break, % | 615 | 785 | 650 | 685 | 503 |

[a]Crosshead speed set at 20 inches per minute.
[b]Slabs cured 40 minutes at 320° F.

The cure characteristics of Examples 1–5 show that the slow curing flashing compositions of this invention should have an extended shelf-life compared to the cure characteristics of a commercial EPDM flashing. The flashings of the present invention, as exemplified in Examples 1–4, can be characterized as having a longer scorch time, a slower cure rate, and a lower maximum torque, which exemplifies a lower state of cure. Differences in compound viscosity between the flashings and commercial EPDM flashing are minimal. However, relative to the commercial EPDM flashing, the flashing compositions of the present invention were much slower curing.

The modulus and green strength at break of the unvulcanized flashing compositions were lower than the commercial EPDM flashing as determined by the green strength test. Green strength is a measure of the ability of the unvulcanized rubber to resist deformation. The flashings illustrated in Table IV, show very high elongations at break, indicating that the flashing is very extendible when installed on the roof of a building. The stress-strain properties of the press cured flashing compositions indicated that as the amount of sulfur and/or accelerator is increased, modulus and tensile strength are increased and elongation at break becomes shorter. In other words, it has been found that the tensile strength of the flashing compositions can be controlled by adjusting the ingredients of and the amount of the cure package.

It is to be understood that the invention is not limited to the specific type of amorphous EPDM exemplified herein or by the disclosure of other EPDMs, the examples having been provided merely to demonstrate practice of the subject invention. Those skilled in the art may readily select other EPDMs having the desired crystallinity characteristics. Similarly, the invention is not necessarily limited to the particular fillers and processing oil exemplified or the amounts thereof. In fact, with respect to the ground rubber, it will be appreciated that this ingredient is essentially optional.

In conclusion, it should be clear from the foregoing examples and specification disclosure that an increase in the amount of EPDM having only up to 2 percent by weight crystallinity and a corresponding decrease of the amount of EPDM having more than 2 percent by weight crystallinity provides a flashing composition which is suitable for use on the corners of a building. By reducing the amount of the higher green strength polymer, e.g., the crystalline polymer, to less than 15 parts and reducing the amount of ground rubber by at least half (6.70 to 3.35 phr) and more preferably, to practically zero, as well as by reducing the amount of cure package ingredients, especially the amount of sulfur (to 0.4 phr), the $T_5$ (time to five point rise) of the flashing composition has been increased from about 7 minutes for commercial EPDM flashing at 135° C. (275° F.) to about 20 or 24 minutes at 135° C. (275° F.) for the flashing compositions exemplified hereinabove.

It will be appreciated that any variables disclosed herein can readily be determined and controlled without departing from the scope of the invention herein disclosed and described. Moreover, the scope of the invention shall include all modifications and variations that fall within the scope of the attached claims.

What is claimed is:

1. A flashing composition consisting essentially of:
   100 parts by weight of an elastomeric polymer consisting essentially of
     from about 85 to 100 parts by weight of at least one ethylene-propylene-diene terpolymer having up to 2 percent by weight crystallinity;
     from 0 to about 15 parts by weight of an ethylene-propylene-diene terpolymer having at least 2 percent by weight crystallinity;
   from about 40 to 120 parts by weight of a filler selected from the group consisting of reinforcing and non-reinforcing fillers and mixtures thereof, per 100 parts of said polymer;
   from about 40 to 105 parts by weight of a processing material selected from the group consisting of paraffinic oils, nahpthenic oils and waxes and mixtures thereof, per 100 parts of said polymer; and
   from about 0.5 to 6 parts by weight of a cure package, per 100 parts of the polymer, said cure package comprising from about 0.1 to 1.25 parts by weight sulfur and from 0.4 to 5 parts by weight vulcanizing accelerators and being devoid of hexasulfides and thioureas.

2. A flashing composition, as set forth in claim 1, wherein said elastomeric polymer includes about 95 to 100 parts by weight of said at least one ethylene-propylene-diene terpolymer having up to 2 percent by weight crystallinity; and from 0 to about 5 parts by weight of said ethylene-propylene-diene terpolymer having at least 2 percent by weight crystallinity.

3. A flashing composition, as set forth in claim 1, wherein said elastomeric polymer consists of 100 parts by weight of an ethylene-propylene-diene terpolymer having up to 2 percent by weight crystallinity.

4. A flashing composition, as set forth in claim 1, wherein said elastomeric polymer consists of at least two ethylene-propylene-diene terpolymers having up to 2 percent by weight crystallinity.

5. A flashing composition, as set forth in claim 4, wherein said elastomeric polymer consists of at least about 85 to 100 parts by weight a first ethylene-propylene-diene terpolymer having up to 2 percent by weight crystallinity, and from 0 to about 15 parts by weight a second ethylene-propylene-diene terpolymer having up to 2 percent by weight crystallinity.

6. A flashing composition, as set forth in claim 1, wherein said filler comprises about 110 parts by weight of carbon black and said composition includes about 82 parts by weight of said processing material.

7. A flashing composition, as set forth in claim 1, wherein said cure package contains 0.4 parts by weight of sulfur and less than 1 part by weight of at least one sulfur vulcanizing accelerator.

8. A flashing composition, as set forth in claim 5, wherein said vulcanizing accelerator is selected from the group consisting of thiuram monosulfides and disulfides; benzothiazole sulfenamides; dithiocarbamates; 2-mercaptoimidazoline; 2-mercaptobenzothiazole; 2-(morpholinodithio)-benzothiazole disulfide; zinc 2-mercaptobenzothiazole and 4,4'-dithiodimorpholine.

9. A flashing composition, as set forth in claim 1, having a thickness ranging from 5 to 200 mils.

10. An EPDM flashing composition consisting essentially of:
   100 parts by weight of an elastomeric polymer consisting essentially of
      from about 85 to 100 parts by weight of at least one ethylene-propylene-diene terpolymer having up to about 2 percent by weight crystallinity, and
      from 0 to 15 parts by weight of an ethylene-propylene-diene terpolymer having at least about 2 percent by weight crystallinity; and
      from about 0.5 to 6 parts by weight of a cure package, per 100 parts of the polymer, said cure package comprising from about 0.1 to 1.25 parts by weight sulfur and from 0.4 to 5 parts by weight vulcanizing accelerators and being devoid of hexasulfides and thioureas;
   said composition having a Mooney viscosity (ML/1+4 at 125° C.) of less than 35 Mooney units and a green strength at break of less than about 65 psi.

11. An EPDM flashing composition, as set forth in claim 10, wherein said elastomeric polymer includes about 95 to 100 parts by weight of said at least one ethylene-propylene-diene terpolymer having up to 2 percent by weight crystallinity; and from 0 to about 5 parts by weight of said ethylene-propylene-diene terpolymer having at least 2 percent by weight crystallinity.

12. An EPDM flashing composition, as set forth in claim 10, wherein said elastomeric polymer consists of 100 parts by weight of an ethylene-propylene-diene terpolymer having up to 2 percent by weight crystallinity.

13. An EPDM flashing composition, as set forth in claim 10, wherein said elastomeric polymer consists of at least two ethylene-propylene-diene terpolymers having up to 2 percent by weight crystallinity.

14. An EPDM flashing composition, as set forth in claim 13, wherein said elastomeric polymer consists of at least about 85 to 100 parts by weight a first ethylene-propylene-diene terpolymer having up to 2 percent by weight crystallinity, and from 0 to about 15 parts by weight of a second ethylene-propylene-diene terpolymer having up to 2 percent by weight crystallinity.

15. An EPDM flashing composition, as set forth in claim 10, wherein said composition has a Mooney viscosity (ML/1+4 at 125° C.) of about 20 to 30 Mooney units and a green strength at break of about 25 to 50 psi.

16. An EPDM flashing composition, as set forth in claim 10, further comprising a filler selected from the group consisting of reinforcing and non-reinforcing fillers and mixtures thereof, per 100 parts of said polymer.

17. An EPDM flashing composition, as set forth in claim 10, further comprising a processing material selected from the group consisting of paraffinic oils, naphthenic oils and waxes and mixtures thereof, per 100 parts of said polymer.

18. An EPDM flashing composition, as set forth in claim 10, wherein said cure package contains 0.4 parts by weight of sulfur and less than 1 part by weight of at least one sulfur vulcanizing accelerator.

19. An EPDM flashing composition, as set forth in claim 18, wherein said vulcanizing accelerator is selected from the group consisting of thiuram monosulfides and disulfides; benzothiazole sulfenamides; dithiocarbamates; 2-mercaptoimidazoline; 2-mercaptobenzothiazole; 2-(morpholinodithio)-benzothiazole disulfide; zinc 2-mercaptobenzothiazole and 4,4'-dithiodimorpholine.

20. An EPDM flashing composition, as set forth in claim 10, having a thickness ranging from 5 to 200 mils.

21. A flashing composition, as set in claim 1, wherein said composition has a green strength at break of less than about 65 psi.

22. A flashing composition, as set forth in claim 1, wherein said composition has a Mooney viscosity of less than about 35 Mooney units (ML/1+4 at 135° C.).

23. An EPDM flashing composition, as set forth in claim 10, wherein said composition has a green strength at break of from about 25 to 50 psi.

* * * * *